W. DAVIES.
Tobacco Stripping and Drying Machine.
No. 203,600. Patented May 14, 1878.
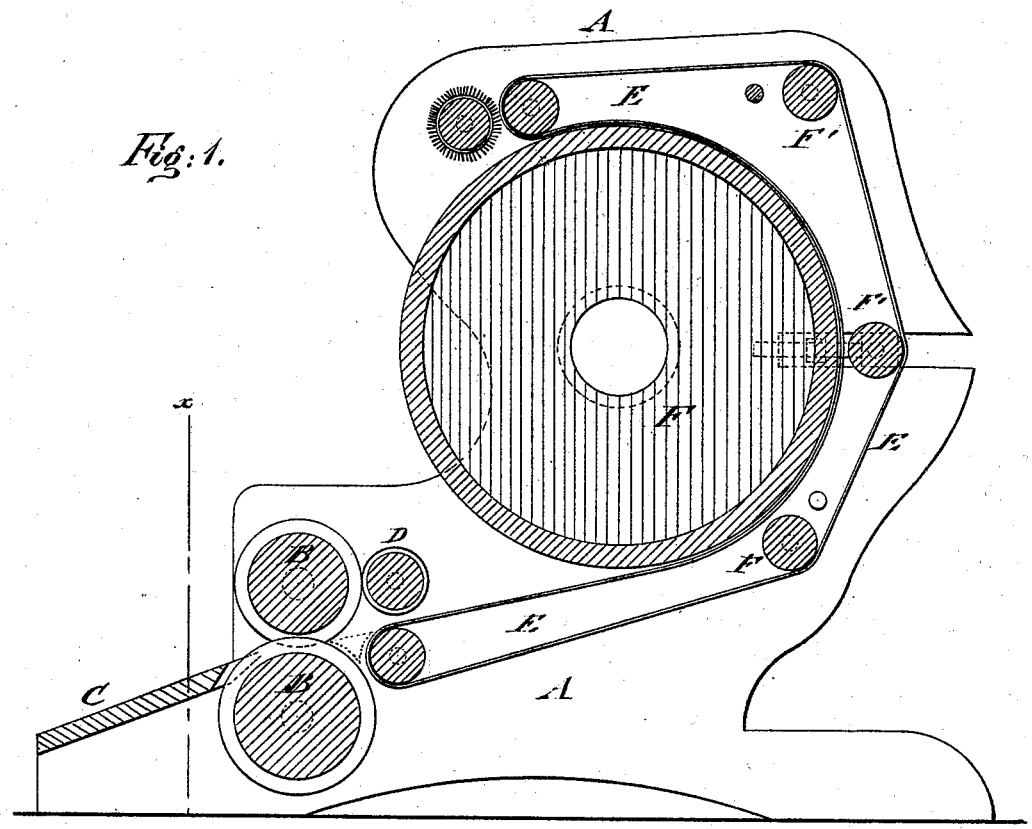
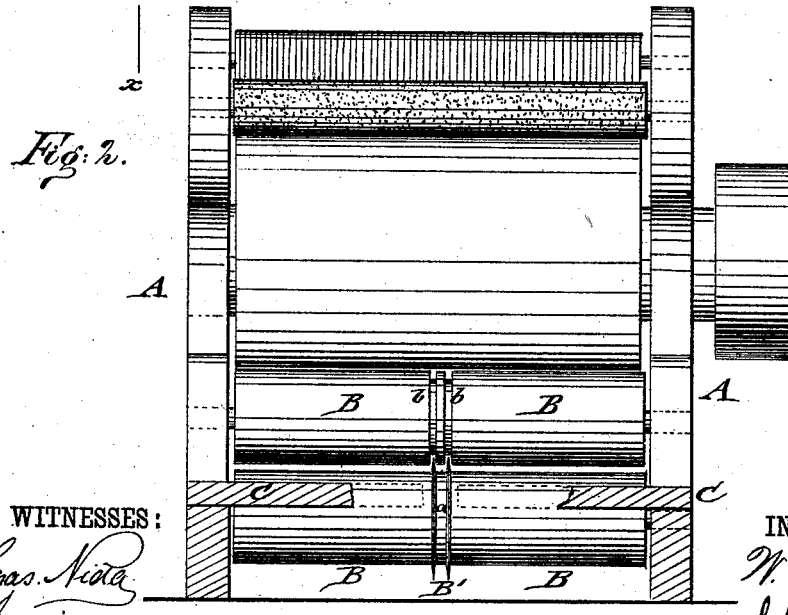
WITNESSES:
INVENTOR:
W. Davies
BY
ATTORNEYS.

UNITED STATES PATENT OFFICE.

WILLIAM DAVIES, OF HENDERSON, KENTUCKY.

IMPROVEMENT IN TOBACCO STRIPPING AND DRYING MACHINES.

Specification forming part of Letters Patent No. 203,600, dated May 14, 1878; application filed April 16, 1878.

*To all whom it may concern:*

Be it known that I, WILLIAM DAVIES, of Henderson, in the county of Henderson and State of Kentucky, have invented a new and Improved Tobacco Stripping and Drying Machine, of which the following is a specification:

In the accompanying drawing, Figure 1 represents a vertical longitudinal section of my improved tobacco stripping and drying machine; and Fig. 2, a front elevation of the same, partly in section, on line $x$ $x$, Fig. 1.

Similar letters of reference indicate corresponding parts.

This invention has reference to improvements in the tobacco stripping and drying machine for which Letters Patent have been granted to me under date of August 14, 1877, and numbered 194,134. The leaves are stripped from the stems, and flattened and dried in more convenient and perfect manner, and finally conducted off to be packed; and the invention consists of the combination, with the revolving stripping-rollers, of an endless conducting-belt, that is lapped around a part of the circumference of a large heating-cylinder and returned over suitable stretching-rollers, the tobacco being carried around the cylinder by the lapping belt, and cleared from the belt or cylinder by suitable attachments, to be then conducted off for packing.

Referring to the drawing, A represents a supporting-standard of my improved tobacco stripping and drying machine, and B the stripping and drying rolls, which are arranged at the lower front part of the machine, in connection with an inclined feeding-table, C, upon which the leaf is placed so as to be fed to the stripping-rolls B after having been spread out to its natural limits. The rolls B are of any desired length or diameter, and revolve by suitable power in opposite direction to each other. They are made hollow or solid, and heated by steam or other agency, one roll being provided with circular knives B′, which are separated by an intermediate part, $a$, while the other roll is provided with grooves $b$, that correspond and register with the knives of the other roll. The knives cut out the stems when the leaves are passed through between the rolls, which rolls serve, also, for the purpose of flattening the leaves and conducting them over intermediate clearing-rolls D or other devices to an endless traveling belt or apron, E, that is lapped around a part of the circumference of the cylinder or drum F, of suitable size, and returned over a number of stretching-rolls, F′, of which one or more may be made adjustable by suitable tension-screws, so as to keep the conducting-belt tightly stretched around the cylinder and over the guide-rolls.

The large cylinder F is heated up in any suitable manner, so as to dry the leaves as they are passed along the same by means of overlapping belt, so that they are entirely flattened and dried during their passage along the cylinder, and by their exposure for a certain length of time to the heat of the same.

In front of the upper part of the cylinder and traveling belt, as well as in connection with the heating and stripping rolls, may be arranged a scraping-knife and clearing-brush, or other suitable devices, for the purpose of clearing any adhering tobacco-leaves from the surface of the cylinder, as well as from the belt, and conducting them onto a returning belt or traveling apron, that conducts the leaves away and to the place where they are to be booked and packed.

The manner of operation is as follows: The operator places one end of the leaf between the stripping-rolls, with the stem pointing either end into the space between the knives. The leaf is then caught and drawn through between the stripping-rolls and passed onto the endless belt, which travels against the face of the large heating-cylinder. The leaf is thus carried around and between the belt and the surface of the heating-cylinder, and delivered finally stripped clean from the stems and in flattened and dried condition, so as to be ready for packing.

Having thus described my invention, what I claim as new, and desire to secure by Letters Patent, is—

1. A machine for stripping and drying leaf-tobacco, consisting of revolving and heated stripping-rolls, of an endless conducting apron or belt, and of a heating cylinder or drum, over a part of whose surface the belt is lapped and tightly pressed against the same, substantially as and for the purpose set forth.

2. The combination, in a tobacco stripping and drying machine, of revolving stripping-rolls with an endless conducting apron or belt that is lapped around part of the circumference of a heating cylinder or drum, and returned over guiding and stretching rolls, and with clearing devices for removing the tobacco from the cylinder or belt, substantially as specified.

WILLIAM DAVIES.

Witnesses:
  I. W. WILLIAMS,
  B. HIGGINBOTHAM.